UNITED STATES PATENT OFFICE.

LUDWIG EPSTEIN, OF LONDON, ENGLAND.

METHOD OF MANUFACTURING ELECTRODES FOR SECONDARY BATTERIES.

SPECIFICATION forming part of Letters Patent No. 579,361, dated March 23, 1897.

Application filed September 5, 1896. Serial No. 605,024. (No specimens.)

*To all whom it may concern:*

Be it known that I, LUDWIG EPSTEIN, a subject of the Emperor of Austria-Hungary, residing at Rosebank, Park Road, East Twickenham, London, in the county of Middlesex, England, have invented new and useful Improvements in the Manufacture of Electrodes for Secondary Batteries, of which the following is a specification.

My invention relates to the manufacture of electrodes for secondary batteries, applying chiefly to those of plate form for use in secondary voltaic batteries, the object which I have in view being to avoid the use of material such as is liable to become detached and to obtain plates of high capacity. For this purpose I first prepare the surfaces of lead plates in such a manner as to give them certain porosity and render them capable of being impregnated with liquid. This may be done, as described in the specification of my British Patent No. 350 of 1890, by immersing the lead plates in boiling water acidulated with a small proportion of nitric acid or containing a salt capable of dissolving lead. I then serve the surfaces so prepared with a mixture which may be wholly or partly solution of any of the oxids of lead and caustic alkali and dry them. I find a suitable proportion of mixture such that at least half of the lead oxid is in solution in the caustic alkali, which is in the condition of saturated solution. I convert these plates into negative electrodes by connecting them to the negative pole of a suitable source of electricity while they are immersed in an electrolyte, which may be dilute sulfuric acid or a solution of a suitable salt, such as a soluble sulfate or sulfite of an alkali or an earth.

For converting the plates into positive electrodes I first subject them to the action of acid, preferably sulfuric acid, or it may be sulfurous acid, or a suitable solution, such as magnesium sulfate, so as to neutralize the alkali, and dry them, and after repeating this several times I connect them to the positive pole of a suitable source of electricity while they are immersed in the acid electrolyte above mentioned.

The conversion of the plates to positive and negative, respectively, may be effected simultaneously in the electrolyte mentioned, the plates being connected, respectively, to the positive and negative poles of the source of electricity. I find it is of advantage to make all the plates negative in the first instance, and then, having dried some of them, I render these positive by connecting them to the positive pole of a source of electricity while they are immersed in the electrolyte.

Although I have mentioned plates as the form of the electrodes produced as above described, obviously bodies of other forms may be thus converted into electrodes.

Having thus described the nature of this invention and the best means I know of carrying the same into practical effect, I claim—

The herein-described method of manufacturing electrodes for secondary batteries, which consists in first rendering porous the surfaces of lead plates or bodies, then treating them with a mixture of lead oxid and caustic alkali, then drying, and finally converting certain of said plates or bodies into negative electrodes and others into positive electrodes by immersing them in an electrolyte and connecting them, respectively, to the negative and positive poles of a source of electricity, as and in the manner set forth.

In testimony whereof I have signed my name to this specification, in the presence of two subscribing witnesses, this 27th day of August, A. D. 1896.

LUDWIG EPSTEIN.

Witnesses:
HAROLD IMRAY,
JNO. P. M. MILLARD.